(12) United States Patent
Doerr

(10) Patent No.: US 7,302,137 B2
(45) Date of Patent: Nov. 27, 2007

(54) OPTICAL COUPLER APPARATUS AND METHOD

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 239 days.

(21) Appl. No.: 11/089,640

(22) Filed: Mar. 25, 2005

(65) Prior Publication Data

US 2006/0215957 A1 Sep. 28, 2006

(51) Int. Cl.
*G02B 6/26* (2006.01)

(52) U.S. Cl. .............................. 385/31; 385/32; 385/39; 385/11; 385/27; 385/30; 385/50

(58) Field of Classification Search ................. None
See application file for complete search history.

(56) References Cited

U.S. PATENT DOCUMENTS

| | | | | |
|---|---|---|---|---|
| 4,737,007 A | * | 4/1988 | Alferness et al. ............. | 385/30 |
| 4,983,006 A | * | 1/1991 | Nishimoto ................... | 385/16 |
| 5,175,778 A | * | 12/1992 | Nourshargh et al. .......... | 385/42 |
| 5,495,544 A | * | 2/1996 | Smith et al. .................. | 385/41 |
| 2002/0015561 A1 | * | 2/2002 | Kawashima et al. .......... | 385/42 |

FOREIGN PATENT DOCUMENTS

| | | | |
|---|---|---|---|
| GB | 2223323 | * | 4/1990 |
| JP | 63071377 | | 3/1988 |
| JP | 08-184720 | * | 7/1996 |

OTHER PUBLICATIONS

R. Ulrich et al., "Self-Imaging In Homogeneous Planar Optical Waveguides", *Appl. Phys. Lett.*, vol. 27, No. 6, pp. 337-339, 1975, date unknown.

L. B. Soldano et al., "Planar Monomode Optical Coupters Based On Multimode Interference Effects", *Journal of Lightwave Technology*, vol. 10, No. 12, pp. 1843-1850, Dec. 1992.

C. Dragone, "Efficient NxN Star Couplers Using Fourier Optics", *Journal of Lightwave Technology*, vol. 7, No. 3, pp. 479-489, Mar. 1989.

L. Leick et al., "Achieving Small Process Tolerant Wavelength-Flattened 3 dB Directional Couplers In Silica-On-Silicon", *Integrated Photonics Research Conference*, paper IthB6, pp. 63-65, 2001, date unknown.

H. Yajima, "Dielectric Thin-Film Optical Branching Waveguide", *Appl. Phys. Lett.*, vol. 22, No. 12, pp. 647-649, 1973, date unknown.

R. Adar et al., "Adiabatic 3-dB Couplers, Filters, and Multiplexers Made With Silica Waveguides on Silicon", *Journal of Lightwave Technology*, vol. 10, No. 1, pp. 46-50, Jan. 1992.

(Continued)

*Primary Examiner*—Frank G. Font
*Assistant Examiner*—James P. Hughes

(57) ABSTRACT

A planar lightwave circuit coupler including first and second waveguides with curved coupling portions having radii of curvature selected such that the coupler has a splitting ratio that is substantially wavelength and polarization insensitive.

8 Claims, 4 Drawing Sheets

OTHER PUBLICATIONS

K. Jinguji et al., "Mach-Zehnder Interferometer Type Optical Waveguide Coupler With Wavelength-Flattened Coupling Ratio", *Electronics Letters*, vol. 26, No. 17, pp. 1326-1327, Aug. 16, 1990.

C. R. Doerr et al., "Cross-Connect-Type Wavlength Add-Drop Node With Integrated Band Muxes, Interleavers, And Monitor", *Optical Fiber Communication Conference Digest*, posteadline paper PD33, 2003, date unknown.

M. Oguma et al, "Compactly Folded Waveguide-Type Interleave Filter With Stabilized Couplers", *Optical Fiber Communication Conference Digest*, paper TuK3, pp. 70-72, 2002, date unknown.

N. M. O'Sullivant et al., "Wavelength-Flattened Response In Bent Fibre Couplers", *Electronics Letters*, vol. 28, No. 16, pp. 1485-1486, Jul. 30, 1992.

H. A. Haus, *Waves and Fields in Optoelectronics*, Prentice-Hall, Englewood Cliffs, New Jersey, 1984, date unknown.

C. K. Madsen et al., "Integrated All-Pass Filters For Tunable Dispersion And Dispersion Slope Compensation", *IEEE Photonics Technology Letters*, vol. 11, No. 12, pp. 1623-1625, Dec. 1999.

Chen Y et al., "Enhanced WDM Performance Using Curved Waveguide Couplers", *Optics Communications*, North-Holland Publishing Co. Amsterdam, NL, vol. 228, No. 4-6, Dec. 15, 2003, pp. 319-330.

*Database Inspec [Online] The Institution of Electrical Engineers*, Stevenage, GB; Jul. 30, 1992, "Wavelength-flattened Response in Bent Fibre Couplers", XP002391537.

Doerr C R et al, "Bending Of A Planar Lightwave Circuit 2*2 Coupler To Desensitize It To Wavelength, Polarization, and Fabrication Changes", *IEEE Photonics Technology Letters, IEEE USA*, vol. 17, No. 6, Jun. 2005, pp. 1211-1213.

\* cited by examiner

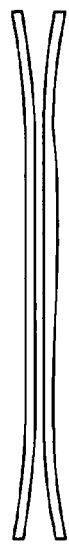
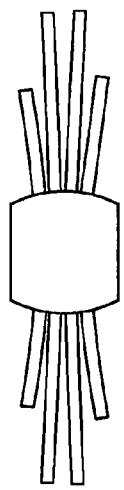
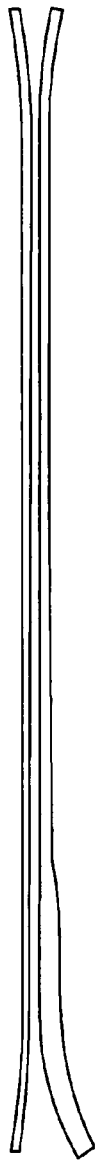
*FIG. 1A* PRIOR ART
*FIG. 1B* PRIOR ART
*FIG. 1C* PRIOR ART
*FIG. 1D* PRIOR ART
*FIG. 1E* PRIOR ART
*FIG. 1F* PRIOR ART

OPTICAL COUPLER APPARATUS AND METHOD

BACKGROUND OF THE INVENTION

1. Field of the Invention

The present invention relates generally to methods and apparatus for coupling optical signals, and more particularly planar lightwave circuit (PLC) couplers with improved wavelength and polarization sensitivity.

2. Description of Related Art

Optical couplers are employed in a variety of planar lightwave circuits (PLCs), including, for example, Mach-Zehnder interferometer (MZI) based switches, MZI based filters, taps, etc. The lowest-loss 2×2 coupler is a directional coupler (shown in FIG. 1(a), also called an evanescent coupler), which includes two waveguides arranged in close proximity to allow coupling of light between the waveguides. The splitting ratio of the conventional directional coupler, however, is highly sensitive to: 1) the wavelength of the light propagated through the coupler, 2) the polarization of such light, and 3) variations in the PLC coupler structure (e.g. waveguide width) which can occur during fabrication (hereinafter collectively referred to as wavelength, polarization, and fabrication (WPF) splitting sensitivity).

There are three main approaches to decrease the WPF splitting sensitivity of 2×2 couplers: 1) couple to extra modes (i.e., couple the two input modes to many modes inside the coupler and then couple back to two output modes), 2) make the coupler asymmetric, or 3) use multiple sections.

A multi-mode interference (MMI) coupler (shown in FIG. 1(b)) is one example of a device for coupling to extra modes. This coupler excites more than two modes in the coupling region. The increased number of modes can decrease the splitting sensitivity to WPF changes because uncertainties are averaged out among many modes. However, MMI couplers typically exhibit undesirable excess loss, and are sensitive to waveguide-width variations that occur during PLC fabrication. Another example of a multimode coupler is the star coupler (shown in FIG. 1(c)). However, as with the MMI coupler, 2×2 star couplers typically exhibit high excess loss.

An asymmetric coupler (shown in FIG. 1(d)) is a directional coupler having two coupled waveguides of different widths. In directional couplers, the splitting ratio varies sinusoidally between 0% and some value (R) as the coupler length is varied (see FIG. 4). In a symmetric coupler, R is 100%. In an asymmetric coupler, R is <100% (since the asymmetric nature causes already coupled light to become out of phase with newly in-coupled light before 100% of the light can be coupled over as the coupler length is increased). Asymmetric couplers are typically designed such that R is a desired splitting ratio, and the coupler length is selected such that the splitting ratio achieved is near the peak of the sinusoid (see FIG. 4). Thus, the first-order dependence of the coupling ratio on the length is removed. Asymmetric couplers, however, are highly sensitive to variations of the waveguide width from a desired width, which can occur during PLC fabrication.

Another example of an asymmetric coupler is the "adiabatic coupler" (shown in FIG. 1(e)). The waveguides of the adiabatic coupler are asymmetric at one end of the coupling region and symmetric at the other end. The operation principle for these couplers is that the couplers vary from symmetric to asymmetric so gradually that each of the two eigenmodes of the local waveguide structure at the symmetric end convert perfectly to each of the two eigenmodes of the local waveguide structure at the asymmetric end. Adiabatic couplers, however, are comparatively very long thus increasing device size and cost.

Finally, multi-section couplers (e.g. the two section coupler shown in FIG. 1(f)) include two or more directional couplers connected with waveguides having a small path-length difference. The small path-length differences are chosen such that the WPF-dependences (or sensitivities) of the directional couplers partially cancel each other out. Two-coupler, three-coupler, and four-coupler multi-section couplers have been proposed and demonstrated. These multi-section couplers, however, are very long thus increasing device size and cost.

BRIEF SUMMARY OF THE INVENTION

The present invention provides a PLC coupler apparatus for coupling of optical signals with improved wavelength, polarization, and fabrication sensitivity. PLC couplers in accordance with the present invention with waveguides arranged in a curved configuration cause the coupler to have a maximum possible splitting ratio, as wavelength, polarization, or fabrication are varied, that is less than 100%. By making this maximum possible splitting ratio equal to a desired splitting ratio and setting the coupler length such that the actual splitting ratio is equal to the desired splitting ratio when the parameter of interest (e.g., the center wavelength of the coupler) is equal to the desired one, the first-order dependence of the splitting ratio on the parameter of interest is removed.

Additionally, both waveguides of the coupler can be narrow, which allows the width of the waveguides to be a minimum mode width, making the coupler much less sensitive to waveguide width variations compared to conventional asymmetric couplers. Furthermore, making both waveguides narrow increases the coupling strength, allowing the coupler to be shorter than conventional asymmetric coupler thus reducing PLC fabrication cost.

In one preferred embodiment, a substantially wavelength and polarization insensitive PLC coupler is provided. The PLC coupler comprises a first waveguide including a curved coupling portion with a radius of curvature $R_{c1}$, and a second waveguide including a curved coupling portion with a radius of curvature $R_{c2}$. The coupling portion of the second waveguide is operatively coupled to the coupling portion of the first waveguide such that light can be coupled between the first and second waveguides.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

In the drawings:

FIGS. 1(a)-(f) are illustrations of prior art couplers;

DETAILED DESCRIPTION OF THE INVENTION

Figure 2:
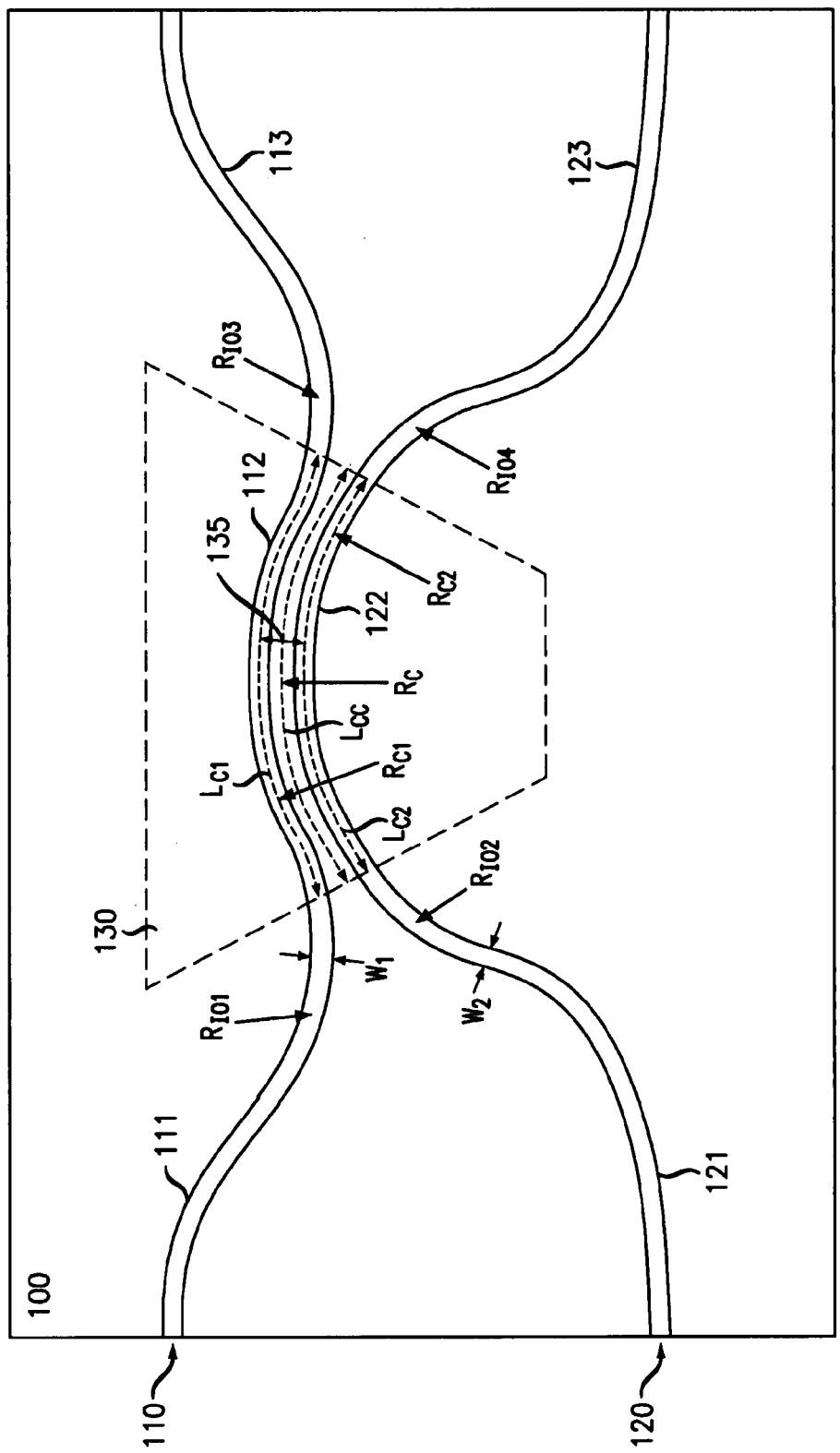
FIG. 2 is an illustration of a PLC coupler according to one embodiment of the invention.

FIG. 2 is an illustration of one embodiment of a PLC coupler 100 according to the invention. The PLC coupler 100 preferably comprises a first waveguide 110 and a second waveguide 120. Each of the first and second waveguides 110, 120 include an input portion 111, 121, a curved coupling portion 112, 122 in a coupling region 130, and an output portion 113, 123, respectively.

The input and output portions 111, 121, 113, 123 of the first and second waveguides preferably have radii of curvature $R_{io1}$, $R_{io2}$, $R_{io3}$, $R_{io4}$, (or "bend radii") that are substantially the smallest possible without creating significant bend radiation loss to minimize contributions to the coupling from the input/output waveguides 111, 121, 113, 123.

The curved coupling portions 112, 122 of the first and second waveguides 110, 120 are operatively coupled (e.g. placed in close proximity) in the coupling region 130 such that light in the first or second waveguides 110, 120 couples between the waveguides 110, 120. The curved coupling portions 112, 122 have radii of curvature $R_{c1}$ and $R_{c2}$, respectively. $R_{c1}$ and $R_{c2}$ are preferably selected such that the maximum possible splitting ratio for the PLC coupler 100 is equal to a desired splitting ratio. The coupling portions 112, 122 of the first and second waveguides 110, 120 have lengths $L_{c1}$, $L_{c2}$. $L_{c1}$ and $L_{c2}$ are preferably selected such that the PLC coupler 100 exhibits a maximum splitting ratio in a desired wavelength range.

When $R_{c1}$ and $R_{c2}$ are finite, light coupled from, for example, the first waveguide 110 to the second waveguide 120 travels a different distance than light traveling only in the first waveguide 110 (i.e. uncoupled light). This results in light that couples into the second waveguide 120 later in the coupling region being out of phase with previously coupled light before 100% of the light couples over. Coupling of light out of phase causes destructive interference thus preventing additional coupling. Therefore, the maximum possible splitting ratio when $R_{c1}$ and $R_{c2}$ are finite is less than 100% regardless of coupler length or wavelength.

A gap 135 having a desired width is formed between the coupling portions 112, 122 of the first and second waveguides 110, 120 (with $R_c$ being the radius of curvature of a centerline extending in the gap 135 in the coupling region). Preferably, the width of the gap 135 is selected to be the smallest gap that can be formed on the PLC without creating significant fabrication difficulty (e.g. asymmetry in the etching of the first and the second waveguides 110, 120). It will be understood by those skilled in the art that a smaller gap 135 produces stronger coupling, which allows for a shorter coupler with less wavelength dependence.

The propagation constants of the first and second waveguides 110, 120 are preferably substantially the same. The splitting ratio of the PLC coupler 100 is substantially wavelength and polarization insensitive. The splitting ratio of the PLC coupler 100 preferably varies by less than ~10% over a frequency range of ~200 nm around a desired center wavelength.

The width ($w_1$) of the first waveguide 110 and the width ($w_2$) of the second waveguide 120 are preferably selected to be about the minimum mode width (i.e. the point at which the fundamental mode in the waveguide has a minimum width). Such a minimum mode width provides improved insensitivity to waveguide width changes.

Formulae for calculating $R_c$ (and accordingly $R_{c1}$ and $R_{c2}$) and $L_c$ can be derived, provided $L_s$, the length of the coupling region of a straight coupler, is known ($R_c$ and $L_c$ are respectively the radius of curvature and length of a centerline of the gap between the coupler waveguides in the coupling region 130, as shown in FIG. 2). Starting with the coupling of modes equations:

$$\frac{da_1}{dz} = -j\beta_1 a_1 + \kappa_{12} a_2 \text{ and } \frac{da_2}{dz} = -j\beta_2 a_2 + \kappa_{21} a_1 \quad (1)$$

where $a_i$ is the field and $\beta_i$ is the effective propagation constant in guide i, $\kappa_{12}$ and $\kappa_{21}$ are the coupling coefficients, and j is the square root of −1. By effective propagation constant we mean the propagation constant using the distance z along the centerline of the gap between the waveguides as the frame of reference. These equations are valid provided $|\kappa|<<|\beta|$, which is the case for typical directional couplers.

If we start with zero field in a first waveguide (guide 1) and field with amplitude $a_2(0)$ in a second waveguide (guide 2), the solution for $a_1$ is $$a_1(z) = \frac{\kappa_{12}}{\beta_0} a_2(0) \sin(\beta_0 z) \exp\left(-j\frac{\beta_1 + \beta_2}{2} z\right), \quad (2)$$

$$\text{where } \beta_0 = \sqrt{\left(\frac{\beta_1 - \beta_2}{2}\right)^2 + |\kappa_{12}|^2}$$

If $L_{s,full}$ is $L_s$ for a straight full coupler (100/0 coupler), then assuming κ is unchanged as compared to a curved coupler, one finds from Eq. (2) that:

$$L_c = \sqrt{C} L_{s,full} \text{ and } R_c = \frac{2sn}{\lambda} L_{s,full} \sqrt{\frac{C}{1-C}} \quad (3)$$

where C is the desired splitting ratio, s is the center-to-center spacing between waveguides in the coupling region, n is the refractive index, and λ is the vacuum wavelength. For example, for a 50/50 coupler C=0.5. Thus, if one has a reasonably good estimate of the length of a straight 100/0 coupler Eq. (3) can be used to approximately determine the structure of a curved PLC coupler according to embodiments of the invention to provide a WPF desensitized coupler with splitting ratio C. It will be appreciated by those skilled in the art that small modifications to $L_c$ and $R_c$ (obtained through straightforward simulations or experimentation), may be used to more precisely achieve the desired splitting ratio C at the desired wavelength λ.

It is noted that the contributions from the coupler input and output portions (e.g. 111, 121, 113, 123) were not included in the above calculations. Those skilled in the art will appreciate that although these contributions can be quite significant (e.g. together contributing ~37% of the total coupling in a typical straight 50/50 coupler), because the contributions were ignored for both straight and curved couplers according to the invention when deriving Eq. (3), Eq. (3) is sufficiently accurate to use as an initial design guideline. For example, if a design for a straight 50/50 directional coupler is established, with $L_s$=500 µm, the design of a 50/50 curved coupler can be determined. First, the straight length for a 100/0 straight coupler is estimated, which would be ~(2-0.37)/(1-0.37)×500 µm=1300 µm. Then using Eq. (3), $L_c$=919 µm. $R_c$ can also be calculated from (3), using the s of the straight coupler.

Experimental 50/50 couplers in silica-on-silicon waveguides with a 0.80%-index contrast and 6.0-µm core height were constructed to test aspects of the invention. A conventional straight directional coupler was made, with waveguide width=4.3 µm, gap=3.95 µm, $R_{io}$=10 mm, and $L_s$=620 µm. A curved PLC coupler according to embodiments of the invention was made next to the conventional straight coupler with waveguide width=4.3 µm, gap=3.9 µm, $R_{io}$=10 mm, $R_c$=27 mm, and $L_c$=1178 µm. If portions of the input and output waveguide portions are included in calculating the total coupler length to where the waveguides are fully uncoupled (e.g., ~19 µm apart, giving a total length on each side for the input/output waveguides of 320 µm long), then the total length of the curved PLC coupler is only 1.4 times the total length of the straight coupler.

Figure 3:
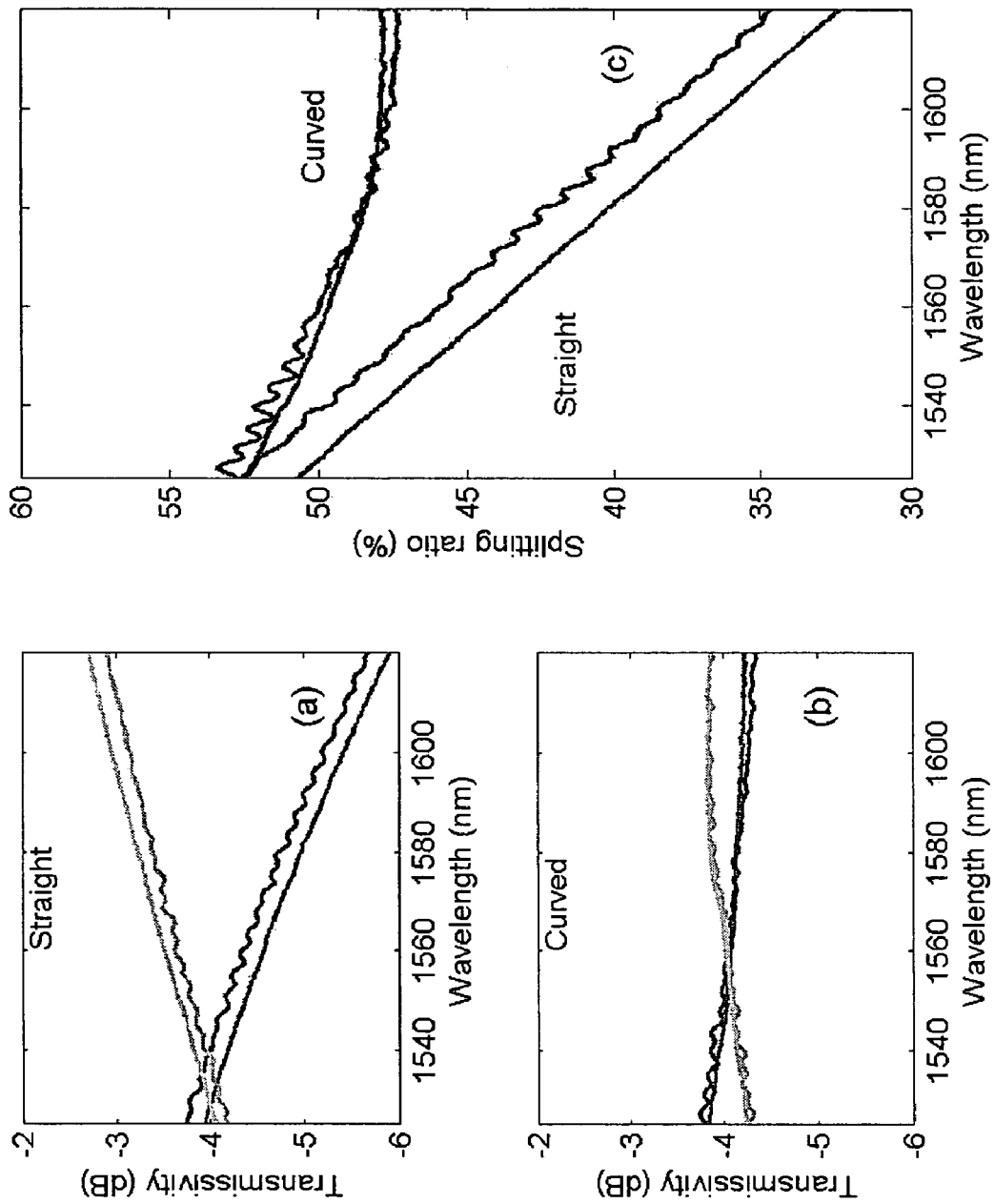
FIGS. 3(a)-(b) are plots showing the measured transmissivity vs. wavelength for a straight coupler, and a PLC coupler according to an embodiment of the invention.
FIG. 3(c) is a plot showing the splitting ratio vs. wavelength for a straight coupler and a PLC coupler according to an embodiment of the invention.
Figure 4:
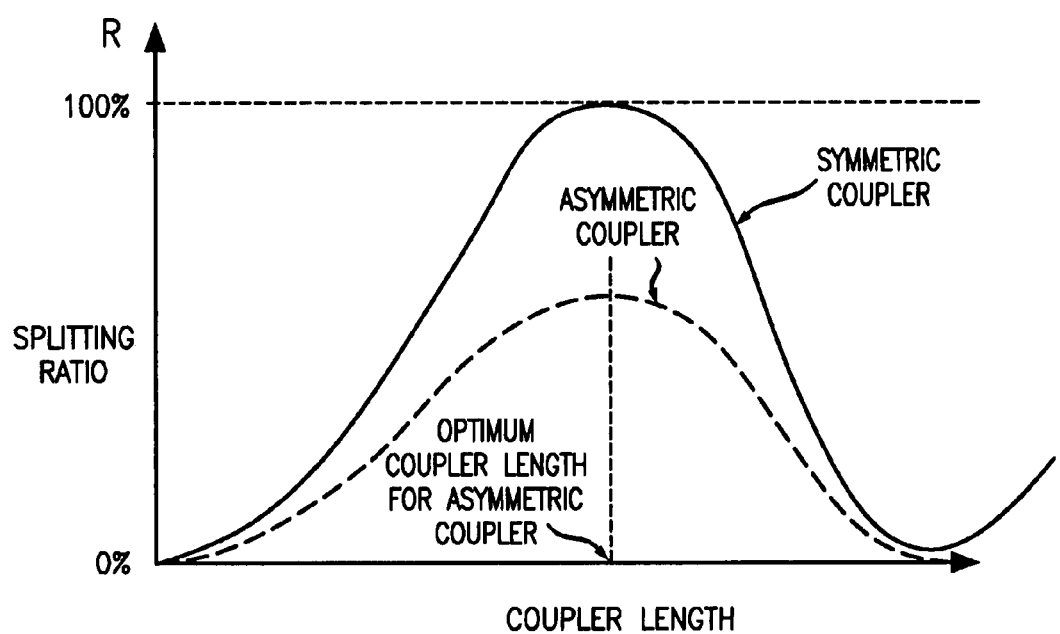
FIG. 4 is a plot graphically illustrating the splitting ratio vs. coupler length for symmetric and asymmetric couplers.

FIGS. 3(a)-(b) respectively show plots of the measured transmissivities for both transverse electric (TE) and transverse magnetic (TM) polarizations of the straight coupler and the curved PLC coupler according to the invention vs. wavelength over the C and L bands. The measured losses are the fiber-to-fiber losses. Those skilled in the art will appreciate that the curved PLC coupler is much less sensitive than the straight coupler to both wavelength and polarization yet has no additional loss. FIG. 3(c) shows plots of the measured splitting ratios of the straight coupler and the curved PLC coupler according to the invention vs. wavelength over the C and L bands. Across the C and L bands the splitting ratio of the straight coupler varies by ~20%, whereas the splitting ratio of the curved PLC coupler varies by less than ~5%.

Simulations were also conducted to determine the fabrication sensitivity of curved PLC couplers according to embodiments of the invention. Using 2-D beam propagation, a curved PLC coupler was compared to a straight asymmetric coupler (using similar parameters given above), with one waveguide 4.3 µm wide and the other 5.1 µm wide. $L_s$=1000 µm. Both couplers were designed and verified to be wavelength-insensitive at λ=1550 nm. Decreasing all the waveguide widths by 0.3 µm on each side changed the curved PLC coupler coupling ratio from 50/50 to 48/52, whereas the straight asymmetric coupler coupling ratio changed from 50/50 to 28/72. In another simulation, we confirmed that the wavelength-sensitivity of the curved PLC coupler becomes even flatter when the center-to-center spacing between the waveguides in the coupling region 130 is decreased.

It is understood that one potential drawback to a desensitized coupler is that a reduced WPF sensitivity in splitting ratio may result in an increased WPF sensitivity in phase difference between the output signals when the coupler is excited at a single input. Calculations were conducted to study the relationship between splitting sensitivity and phase difference sensitivity.

The operation of single-section couplers can be described by the matrix $R^{-1}(\theta_1)P(\phi)R(\theta_2)$, where R and P are:

$$R(\theta) = \begin{bmatrix} \cos\theta & j\sin\theta \\ j\sin\theta & \cos\theta \end{bmatrix} \text{ and } P(\phi) = \begin{bmatrix} \exp\left(-j\frac{\phi}{2}\right) & 0 \\ 0 & \exp\left(j\frac{\phi}{2}\right) \end{bmatrix} \quad (1)$$

θ tells the splitting ratio to the two eigenmodes of the coupler, and φ tells the phase shift between the two eigenmodes of the coupler. Let us make an assumption that WPF changes cause an error in φ, such that φ becomes φ(1+ε), and no error in θ. ε<<1. This is reasonable for conventional straight couplers and curved couplers according to the invention because WPF changes primarily affect the coupler eigenmode propagation constants but do not change the eigenmode shape.

The table below shows four different choices for $\theta_1$, φ, and $\theta_2$ that give a 50/50 splitting ratio and the resultant errors in splitting ratio and phase difference between the ports.

| Name | $\theta_1$ | φ | $\theta_2$ | Power splitting error | Phase error from left side | Phase error from right side |
|---|---|---|---|---|---|---|
| Conventional straight coupler | $\frac{\pi}{4}$ | $\frac{\pi}{2}$ | $\frac{\pi}{4}$ | $\frac{\pi}{4}\varepsilon$ | 0 | 0 |
| Constant curvature | $\frac{\pi}{8}$ | π | $\frac{\pi}{8}$ | 1.2 $\epsilon^2$ | $\frac{\sqrt{2}\pi}{2}\varepsilon$ | $\frac{\sqrt{2}\pi}{2}\varepsilon$ |
| Small variation in curvature | $\frac{\pi}{5}$ | π | $\frac{\pi}{20}$ | 0.7 $\epsilon^2$ | 0.31 πε | 0.95 πε |
| Large variation in curvature (adiabatic coupler) | $\frac{\pi}{4}$ | >>π | 0 | 0 | 0 | >>πε |

Those skilled in the art will appreciate from the table that the lower the power splitting error the higher the worst-case phase error. For instance, the conventional straight coupler has the worst splitting sensitivity but zero error in phase, whereas the curved coupler with a large variation in curvature (i.e., an adiabatic coupler) has theoretically zero power splitting error but very large phase error at one end of the coupler.

The increased phase sensitivity may cause problems in some devices. For example, an MZI switch using curved PLC couplers in accordance with embodiments of the present invention may have a switch state driving phase that is highly WPF sensitive. One solution to this problem is to use two curved PLC couplers according to embodiments of the invention, oppositely oriented, in an MZI. Provided the environment and design is the same for both curved PLC couplers, any phase change in one coupler will be canceled by that of the other coupler.

It will be understood by those skilled in the art that $R_{c1}$ and $R_{c2}$ may be varied over the lengths ($L_{c1}$, $L_{c2}$) of the coupling portions of the first and second waveguides 110, 120. By varying $R_{c1}$ and $R_{c2}$ a desired power splitting sensitivity and a desired phase sensitivity for the coupler can be achieved. For example, for couplers having a small variation in $R_{c1}$ and $R_{c2}$ (row 3 of the above table), $R_{c1}$ and $R_{c2}$ preferably are gradually changing (e.g. decreasing or increasing monotonically). For couplers having a large variation in $R_{c1}$ and $R_{c2}$ (row 4 of the above table), $R_{c1}$ and $R_{c2}$ preferably vary from infinity to a finite value (or vice versa) from one end of the coupling region 130 to the other.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A planar lightwave circuit (PLC) coupler comprising:
   a first waveguide including a curved coupling portion with a finite radius of curvature $R_{c1}$; and
   a second waveguide including a curved coupling portion with a finite radius of curvature $R_{c2}$, the coupling portion of the second waveguide being operatively coupled to the coupling portion of the first waveguide such that light can be coupled between the first and second waveguides, wherein finite radius of curvatures $R_{c1}$ and $R_{c2}$ both have a common direction of curvature;
   wherein the propagation constants of the first and second waveguides are substantially the same; and
   wherein the splitting ratio of the coupler varies by less than approximately 10% over a frequency range of approximately 200 nanometers around a selected center wavelength.

2. The coupler of claim 1, wherein the splitting ratio of the coupler varies by less than about 10% over a frequency range of about 100 nm around a desired center wavelength.

3. The coupler of claim 1, wherein the width of the first waveguide ($w_1$) and the width of the second waveguide ($w_2$) are selected such that the fundamental mode in each waveguide is a minimum width.

4. The coupler of claim 1, wherein $R_{c1}$ and $R_{c2}$ are constant over their respective curved coupling portions.

5. The coupler of claim 1, wherein $R_{c1}$ and $R_{c2}$ are selected such that the maximum possible splitting ratio for the PLC coupler is equal to a desired splitting ratio.

6. The coupler of claim 5 wherein the lengths ($L_{c1}$, $L_{c2}$) of the coupling portions of the first and second waveguides are selected such that the coupler exhibits maximum splitting ratio in a desired wavelength range.

7. The coupler of claim 1, wherein $R_{c1}$ and $R_{c2}$ vary over the lengths ($L_{c1}$, $L_{c2}$) of the coupling portions of the first and second waveguides such that a desired power splitting sensitivity and a desired phase sensitivity for the coupler are achieved.

8. A method of fabricating a planar lightwave circuit (PLC) for optical coupling comprising the steps of:
   forming a first waveguide and a second waveguide on a PLC, the first waveguide and the second waveguide having curved coupling regions with finite radii of curvature $R_{c1}$ and $R_{c2}$, respectively, wherein finite radii of curvatures $R_{c1}$ and $R_{c2}$ both have a common direction of curvature;
   wherein the propagation constants of the first and second waveguides are substantially the same, and $R_{c1}$ and $R_{c2}$ are selected such that the coupler exhibits a desired splitting ratio, and
   wherein the splitting ratio of the coupler varies by less than approximately 10% over a frequency range of approximately 200 nanometers around a selected center wavelength.

* * * * *